(12) United States Patent
Barker

(10) Patent No.: US 12,186,600 B2
(45) Date of Patent: Jan. 7, 2025

(54) LOW PRESSURE ENCLOSURE VEHICLES HAVING SUPPLEMENTAL OXYGEN SYSTEMS

(71) Applicant: B/E Aerospace, Inc., Winston Salem, NC (US)

(72) Inventor: John Terence Barker, Overland Park, KS (US)

(73) Assignee: B/E AEROSPACE, INC., Winston Salem, NC (US)

( * ) Notice: Subject to any disclaimer, the term of this patent is extended or adjusted under 35 U.S.C. 154(b) by 964 days.

(21) Appl. No.: 17/203,185

(22) Filed: Mar. 16, 2021

(65) Prior Publication Data
US 2022/0297729 A1    Sep. 22, 2022

(51) Int. Cl.
| | | |
|---|---|---|
| *A62B 7/02* | (2006.01) | |
| *B61B 13/10* | (2006.01) | |
| *B61D 27/00* | (2006.01) | |

(52) U.S. Cl.
CPC ............... *A62B 7/02* (2013.01); *B61B 13/10* (2013.01); *B61D 27/00* (2013.01); *B64D 2231/025* (2013.01)

(58) Field of Classification Search
CPC ....... B64D 2231/025; A62B 7/02; A62B 7/14; A62B 18/02; A62B 9/00; A62B 25/005; B61B 13/10

See application file for complete search history.

(56) References Cited

U.S. PATENT DOCUMENTS

| | | | | | |
|---|---|---|---|---|---|
| 4,148,260 | A | * | 4/1979 | Minovitch | B61B 13/10 104/138 |
| 4,154,237 | A | * | 5/1979 | Courter | B64D 11/00 244/118.6 |
| 4,481,945 | A | * | 11/1984 | Levine | B64D 11/0632 128/202.13 |
| 4,909,247 | A | * | 3/1990 | Terrisse | A62B 25/005 128/205.25 |
| 5,301,665 | A | * | 4/1994 | Jumpertz | A62B 25/005 128/205.21 |
| 5,653,175 | A | | 8/1997 | Milligan | |

(Continued)

FOREIGN PATENT DOCUMENTS

| | | |
|---|---|---|
| CN | 108382407 A | 8/2018 |
| CN | 108583602 A | 9/2018 |

(Continued)

OTHER PUBLICATIONS

Extended European Search Report issued, of the European Patent Office, mailed on Aug. 12, 2022, in corresponding European Patent Application No. 22162102.2.

*Primary Examiner* — Zachary L Kuhfuss
*Assistant Examiner* — Cheng Lin
(74) *Attorney, Agent, or Firm* — SNELL & WILMER L.L.P.

(57) ABSTRACT

A low pressure enclosure (LPE) vehicle can include a hull defining a cabin therein. The hull can be configured to travel within a LPE and the cabin can be configured to be pressurized. The LPE vehicle can include a supplemental oxygen system configured to be activated and/or made accessible to one or more occupants within the cabin in a depressurized state such that a cabin pressure is less than a threshold cabin pressure.

20 Claims, 3 Drawing Sheets

(56) References Cited

U.S. PATENT DOCUMENTS

| | | | | |
|---|---|---|---|---|
| 6,913,016 | B2 * | 7/2005 | Pietrantoni | B64D 13/00 |
| | | | | 128/205.24 |
| 7,431,034 | B2 * | 10/2008 | Westphal | B64D 13/00 |
| | | | | 244/118.5 |
| 8,640,702 | B2 * | 2/2014 | Cannon | A62B 9/006 |
| | | | | 128/204.29 |
| 9,089,721 | B1 * | 7/2015 | Horstman | A62B 7/14 |
| 9,770,610 | B2 * | 9/2017 | Rittner | A62B 7/08 |
| 10,493,859 | B2 * | 12/2019 | Zhou | E01B 25/30 |
| 11,291,868 | B2 * | 4/2022 | Elliott | A61M 16/1005 |
| 11,376,450 | B2 * | 7/2022 | Degenhardt | B64D 11/00 |
| 2006/0118115 | A1 | 6/2006 | Cannon | |

FOREIGN PATENT DOCUMENTS

| | | |
|---|---|---|
| CN | 111775971 A | 10/2020 |
| DE | 3725671 A1 | 2/1989 |

\* cited by examiner

LOW PRESSURE ENCLOSURE VEHICLES HAVING SUPPLEMENTAL OXYGEN SYSTEMS

FIELD

This disclosure relates to low pressure enclosure vehicle systems (e.g., a Hyperloop).

BACKGROUND

A transportation system vehicle operating in a low pressure enclosure (e.g., an evacuated tube) at high speed is prone to cabin decompression. Proposed designs (e.g., for a Hyperloop) do not include any provisions for passenger protection in the event of decompression. There is still a need in the art for improved low pressure tube vehicles and systems therefor. The present disclosure provides a solution for this need.

SUMMARY

A low pressure enclosure (LPE) vehicle can include a hull defining a cabin therein. The hull can be configured to travel within a LPE and the cabin can be configured to be pressurized. The LPE vehicle can include a supplemental oxygen system configured to be activated and/or made accessible to one or more occupant (e.g., passengers and/or crew) within the cabin in a depressurized state such that a cabin pressure is less than a threshold cabin pressure.

The supplemental oxygen system can include one or more containers (e.g., an enclosure or other facility) having one or more oxygen dispensing masks and/or an oxygen supply (e.g., supporting the operation of the masks). The one or more containers (e.g., an enclosure or a stowage volume allowance) can be integrated into a cabin structure. In certain embodiments, the cabin structure can be a cabin ceiling or passenger service unit.

The vehicle can include one or more occupant seats. Each of the one or more containers can be disposed over a respective passenger seat of the one or more occupant seats. Any other suitable location is contemplated herein.

In certain embodiments, the threshold cabin pressure is about 8.29 psia. Each container can be configured to allow deployment of the one or more oxygen dispensing masks when pressure sensed by a cabin pressure sensor cabin and/or controller decreases below the threshold (for a set amount of time to provide hysteresis). In certain embodiments, each container can include a controllable container door (e.g., that may form a surface feature of the cabin sealing or cabin interior) to allow the one or more oxygen dispensing masks to drop out of the container when the cabin pressure decreases below the threshold for the set amount of time.

In accordance with at least one aspect of this disclosure, a low pressure enclosure transportation system can include a low pressure enclosure (LPE) (e.g., an evacuated tube) configured to allow a passenger carrying vehicle to be contained therein and move therein. The system can include a low pressure enclosure (LPE) vehicle as disclosed herein, e.g., as described above.

A method can include placing an emergency supplemental oxygen system in a low pressure enclosure vehicle configured to travel within a low pressure enclosure. The low pressure enclosure can be an evacuated tube, for example. The method can include detecting cabin depressurization (e.g., below a threshold), deploying one or masks to provide a suitable amount of oxygen to occupants within the cabin (e.g., such that the mask may be donned and used by the cabin occupant), and partially repressurizing the LPE to reduce a pressure differential between the LPE cavity and the cabin (e.g., to maintain a physiologically acceptable level of cabin pressure in absolute terms) to maintain a suitable emergency cabin pressure for use of the supplemental oxygen system (e.g., in a manner that is specific to the capabilities of the supplemental oxygen system).

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
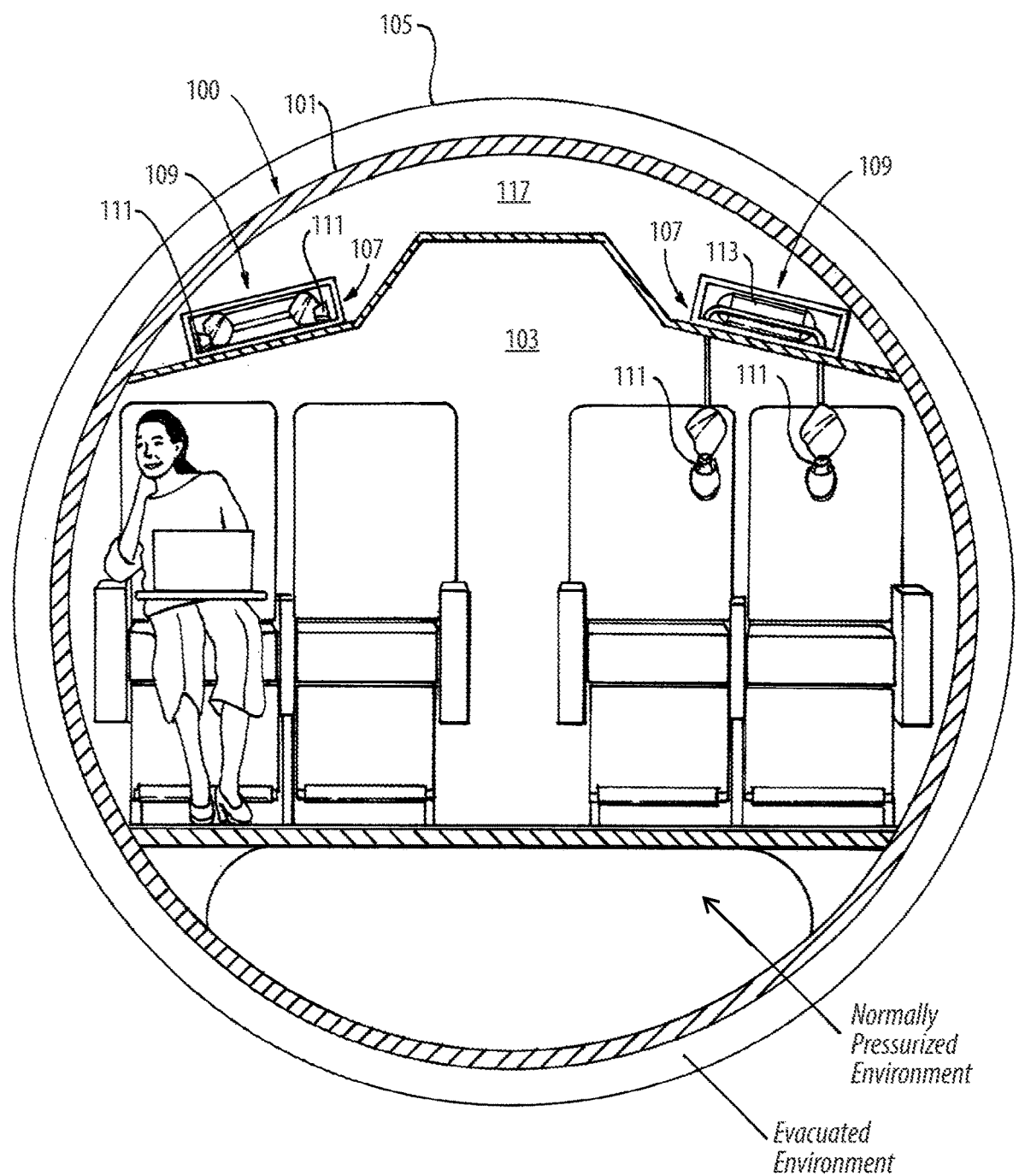
FIG. 1 is a cross-sectional view of an embodiment of a vehicle in accordance with this disclosure, shown disposed in a low pressure enclosure.

Reference will now be made to the drawings wherein like reference numerals identify similar structural features or aspects of the subject disclosure. For purposes of explanation and illustration, and not limitation, an illustrative view of an embodiment of a vehicle in accordance with the disclosure is shown in FIG. 1 and is designated generally by reference character 100. Other embodiments and/or aspects of this disclosure are shown in FIGS. 2-4.

Figure 2:
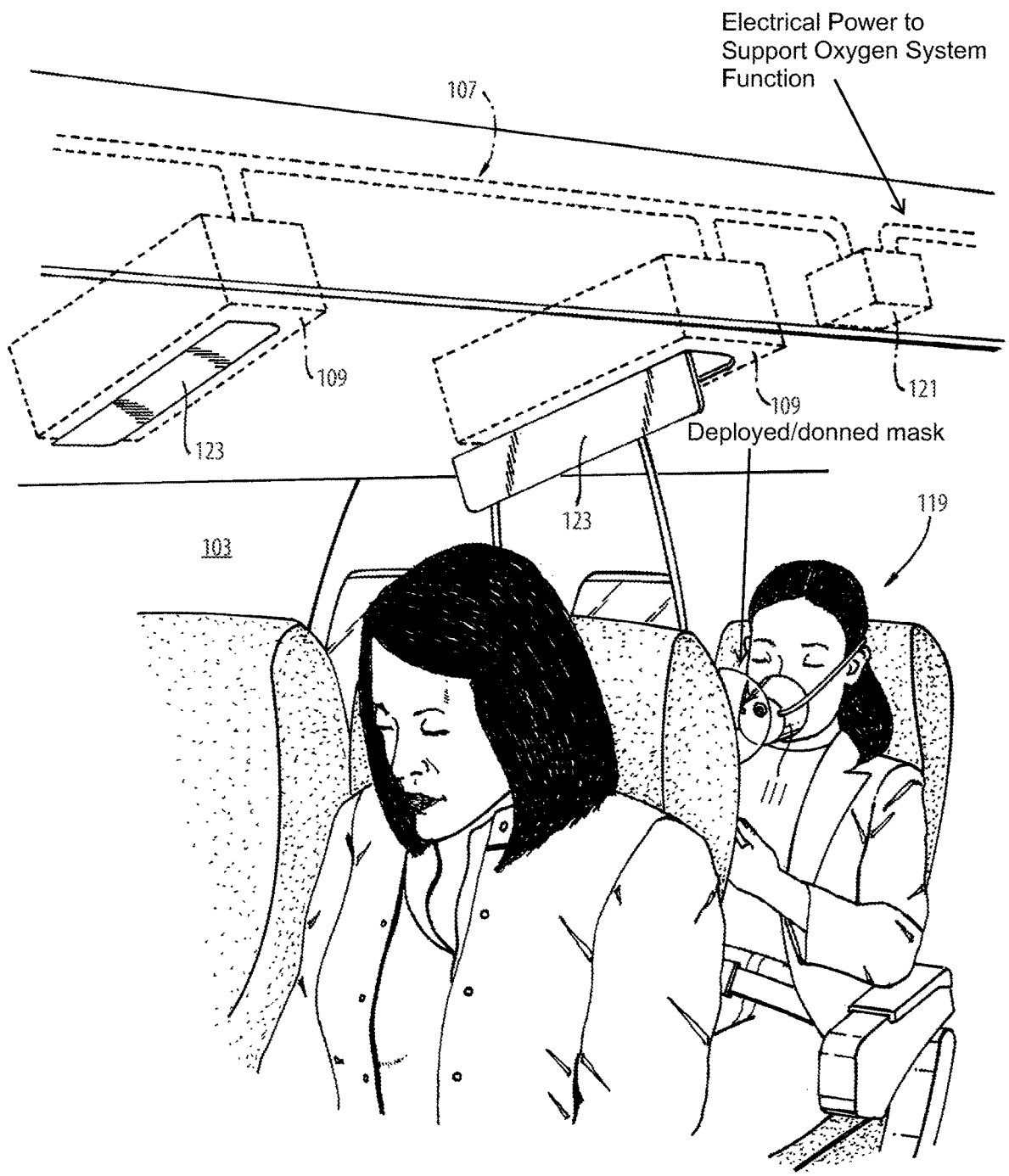
FIG. 2 is a cross-sectional view of the vehicle of FIG. 1.

Referring to FIGS. 1 and 2, a low pressure enclosure (LPE) vehicle 100 (e.g., a Hyperloop rail vehicle) can include a hull 101 defining a cabin 103 therein. The hull 101 can be configured to travel within a LPE 105 and the cabin 103 can be configured to be pressurized. The LPE vehicle 100 can include a supplemental oxygen system 107 configured to be activated and/or made accessible to one or more occupants within the cabin 103 in a depressurized state such that a cabin pressure is less than a threshold cabin pressure.

Figure 3:
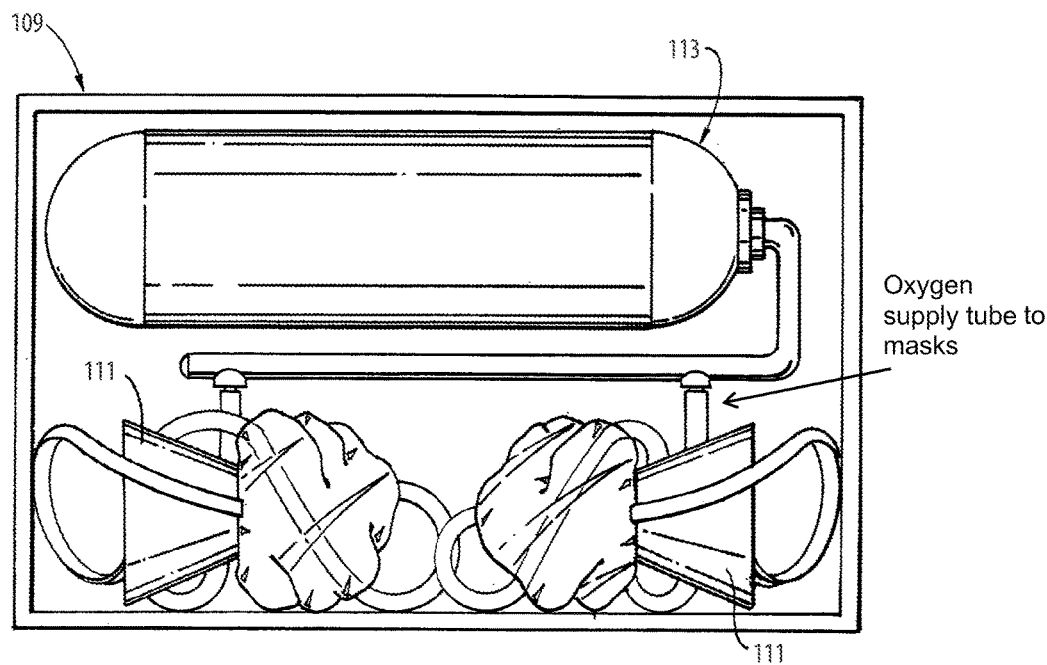
FIG. 3 is schematic diagram of an embodiment of a supplemental oxygen container in accordance with this disclosure.
Figure 4:
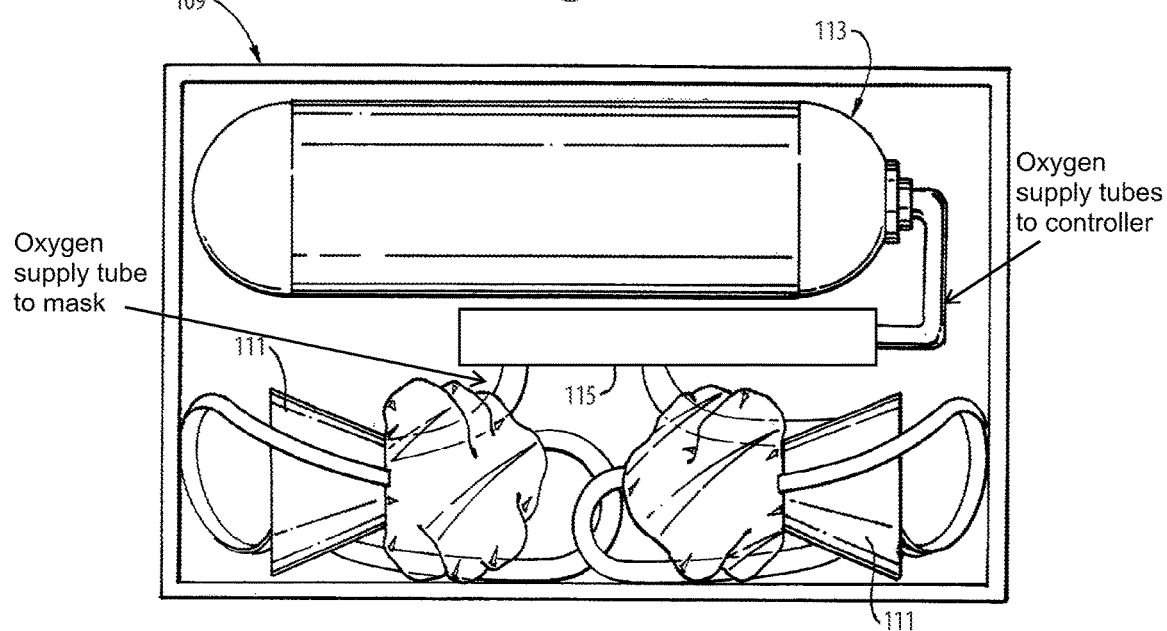
FIG. 4 is schematic diagram of an embodiment of a supplemental oxygen container in accordance with this disclosure.

Referring additionally to FIGS. 3 and 4, the supplemental oxygen system 107 can include one or more containers 109 having one or more oxygen dispensing masks 111 (e.g., wearable by a passenger for providing oxygen to the passenger) and/or an oxygen supply 113 (in selective fluid communication with the one or more oxygen dispensing masks 111). As shown in FIG. 3, the oxygen supply 113 can be a regulated supply (e.g., suitable to support physiological requirements of a typical occupant user under the prevailing cabin pressure, e.g., down to 2.72 psia or 40,000 ft. equivalent). The flow can be provided metered continuously or metered in pulse or bolus form in response to inhalation demand by the user. In certain embodiments, a user must don the mask to start the flow of oxygen, or in the case of a pulse system for example, don the mask and then breath to start the flow of oxygen.

As shown in FIG. 4, the oxygen supply 113 can be a regulated pressure supply, and the container 109 can include an oxygen controller 115 for controlling flow to the one or more oxygen dispensing masks 111. The one or more oxygen dispensing masks 111 can be any suitable oxygen mask known to those having ordinary skill in the art. The oxygen supply 113 can be any suitable oxygen supply (e.g., a compressed gas supply, a liquid oxygen supply, an onboard oxygen generating supply such as a molecular sieve, a chemical supply configured to produce oxygen when activated).

Any suitable oxygen system components and regulation scheme is contemplated herein. For example, phase dilution or constant flow can be used.

As shown in FIGS. 1 and 2, the one or more containers 109 can be integrated into a cabin structure 117. In certain embodiments, the cabin structure 117 can be a cabin ceiling or passenger service unit as shown. Any other suitable structure is contemplated herein. The one or more containers 109 can be an enclosure or can be open (e.g., a stowage volume) and not necessarily be an enclosure.

The vehicle 100 can include one or more occupant seats 119. Each of the one or more containers 109 can be disposed over a respective passenger seat 119 of the one or more occupant seats 119 (e.g., as shown in FIGS. 1 and 2). Any other suitable location is contemplated herein.

In certain embodiments, the threshold cabin pressure is about 8.29 psia (or any other suitable pressure, e.g., according to safety regulations that consider the physiological needs and safety of the cabin occupant). Each container 109 can be configured to allow deployment of the one or more oxygen dispensing masks 111 when cabin pressure sensed by a cabin pressure sensor and/or controller 121 decreases below the threshold (e.g., for a set amount of time, e.g., about 2 seconds or any other suitable time to avoid transient deployment of the masks 111 due to transient cabin pressure). In certain embodiments, the threshold can be absolute and any breaching of the threshold instantly causes deployment of the masks 111. In certain embodiments, each container 109 can include a controllable container door 123 (e.g., via an electromechanical or pneumatically actuated latch) to allow the one or more oxygen dispensing masks 111 to drop out of the container 109 (e.g., as shown in FIG. 2 where the door 123 is in the open position) when the cabin pressure decreases below the threshold (e.g., for the set amount of time or instantly). In certain embodiments, the door may form a surface feature of the cabin sealing or cabin interior, for example. Each container can be located such that a seated passenger may access, don and use a mask when dropped so as to initiate the delivery of oxygen to the mask.

In accordance with at least one aspect of this disclosure, a low pressure enclosure transportation system 125 can include a low pressure enclosure (LPE) 105 (e.g., an evacuated tube or any other suitable structure) configured to allow a passenger carrying vehicle to be contained therein and move therein. The system 125 can include a low pressure enclosure (LPE) vehicle 100 as disclosed herein, e.g., as described above.

In accordance with at least one aspect of this disclosure, a method can include placing an emergency supplemental oxygen system 107 in a low pressure enclosure vehicle 100 configured to travel within a low pressure enclosure 105. The low pressure enclosure 105 can be an evacuated tube, for example. In certain embodiments, a method can include detecting cabin depressurization, deploying masks to provide a suitable amount of oxygen to occupants within the cabin and partially repressurizing the LPE to reduce a pressure differential between the LPE cavity and the cabin to maintain a suitable emergency cabin pressure for use of the supplemental oxygen system. For example, the cabin pressure should not fall below a level than cannot be accommodated by the oxygen system (e.g., to maintain a physiologically acceptable level of cabin pressure in absolute terms, e.g., in a manner that is specific to the capabilities of the supplemental oxygen system). Physiological needs of occupants may be based on absolute pressure exposure, and thus the system can be configured to prevent a pressure drop below a threshold (e.g., 2.72 psia).

Embodiments can include a passenger oxygen system integrated into containers that can be integrated into or are located adjacent to a Passenger Service Units (PSU) immediately above the seated passenger. The container can be a housing that encloses the essential elements of the oxygen system. The container can employ an electric or pneumatic latching mechanism to open a door thereby deploying the masks in the event of a decompression.

In a LPE vehicle, a supplemental oxygen supply can be beneficial to ensure occupant safety if cabin pressure becomes less than about 8.29 psia or 10,000 ft. equivalent altitude. The system can be configured to operate down to a minimum cabin pressure (e.g., of about 2.72 psia or 40,000 ft. equivalent altitude) for the system to be effective in preventing injury to the occupant no less than for example 5.45 psia for more than a period of 2 minutes following a loss of cabin pressure (this being for example to minimize risk of dissolution of nitrogen and other gasses from the blood or body tissue or internal cavities).

Embodiments avoid having to equalizing tube and vehicle pressures to that near ground level in the event of vehicle depressurization. Such a sudden increase in tube pressure from that desired for speed and economy of operation may result in unacceptable levels of deceleration imposed on cabin occupants or cargo being transported. Delays due to such an event are seen as limiting adoption of the technology. An oxygen system may facilitate a reduction in these deceleration loads, completion of the service or allow the safe disembarkation of occupants at the nearest station or designated stopping point.

There have been a variety of vehicular mass transportation system concepts that have been proposed that operate in a non-traditional manner. Low pressure atmosphere systems are noted for their potential to reduce their environmental impact or minimize risk to the general population by operating either underground or inside a tube. These systems are analogous to or are inspired by well-established and traditional modes of rail or levitated transit systems but most have yet to reach fruition due to cost and technical obstacles. The success of these systems in the near term is largely based on their ability to compete with other modes of transport that are generally favored in terms of their technical maturity, established infrastructure, government and regulatory support and customer preferences. All these factors converge to generally hinder the implementation of these alternate means of transport.

More recently a concept known as Hyperloop has garnered sufficient financial support and technical resources to be demonstrated as a proof-of-concept. The intent of Hyperloop is to provide a means of point to point mass transit that is competitive with other established means by significantly increasing the speeds at which the vehicle will travel while minimizing the energy consumed in doing so. To achieve the objective, the Hyperloop vehicle operates in an evacuated continuous length of tube at a pressure in the order of 100 Pa (0.0145 psia). The resulting atmospheric density in the tube serves to reduce aerodynamic drag imparted on the vehicle in motion.

The novelty and challenging aspects associated with the implementation of the Hyperloop technology has garnered much interest and in some cases criticism from the public and academia. One of the main concerns with operating the vehicle at speeds envisaged to approach if not exceed that of jet transport aircraft cruising at altitude are the acceleration forces that may be imparted on occupants under certain conditions or instances of system failure. For example, the physiological risks associated with exposure to low ambient pressure conditions are well understood both in terms of the ability to maintain an acceptable level of saturated arterial blood oxygen (SaO2), as well as prevent the sudden dissolution of nitrogen and other gases into the blood stream and body tissue in general. Thus should the vehicle structure or pressure sealing elements be compromised or fail, then the vacuum pressure conditions in the fore and aft portions of the tube must be immediately if not simultaneously increased so as not to compromise the safety of the occupants who would otherwise be exposed to these evacuated tube pressures. Given that the underlying rationale for operating the vehicle at high speed is directly dependent on the evacuated conditions in the tube, any significant increase in tube pressure to that approaching ground level conditions will impart a high rate of deceleration upon the vehicle and occupants. It is reasonable to assume that other vehicles operating ahead of or behind the compromised vehicle would be without warning affected in the same manner.

Embodiments can be used to allow the level of vacuum in the tube to be maintained at a reasonable and safe level that the compromised vehicle or those also in the vicinity in normal operation do not need to be brought to a sudden stop or slowed at a high rate of deceleration. Embodiments can allow the compromised vehicle or those in the vicinity of its operation to continue to operate such that the service may be completed to the intended destination, or if necessary diverted to the next station for disembarkation.

Embodiments can provide supplemental oxygen to occupants in a manner consistent with methods and levels of performance currently employed in the commercial aviation industry (reference 14 CFR 25 and EASA CS 25 and SAE recommended practices). For example, embodiments can automatically deployed and used if the vehicle cabin pressure exceeds 15,000 ft. equivalent (8.29 psia), and can be configured to be used until the cabin pressure of 10,000 ft, (10.1 psia) or less is established, for example.

Within the functional performance limits and physiological constraints, embodiments can be used in conjunction with tube pressure management in the event of a vehicle decompression such that the vehicle cabin does not exceed 40,000 ft. (2.72 psia) at any time and that the cabin pressure does not exceed 25,000 ft. equivalent (5.45 psia) for more than 2 minutes.

Embodiments of a vehicle can include occupant seats arranged either individually in suites or in columns. On that basis, a passenger service unit or container will be located above the occupant seats that may include the means to stow and deploy oxygen masks when needed either in response to a decompression, or in support of system maintenance or operational check to verify operational availability and function. The oxygen masks can be of a type commensurate with the means of oxygen dispensing, either constant flow or in pulse bolus form and be supplied and operated in the same manner or with the scope as for existing supplemental oxygen systems compliant to the regulations and recommended practices (e.g., for commercial aircraft).

The source and subsequent regulation of the oxygen supply quantity and standard necessary to support the operational requirements of the vehicle cabin pressure conditions may include but not be limited to stored pressurized gaseous oxygen, oxygen generated by the controlled decomposition of an oxidizer chemical such as but not limited to sodium chlorate or sodium monoxide, stored liquid oxygen, and/or an on-board oxygen generation utilizing pressure swing absorption molecular sieves, and/or permeable membranes, and/or hydrolysis of water into constituent elements to generate a supply of oxygen using a pressurized source of air, or by pressurized membranes also using a source of air, or from a source of water.

The regulation and control of these oxygen sources may be of a constant flow at a rate commensurate with the measured state of vehicle cabin pressure, or in the form of controlled bolus pulses of oxygen each delivered to the occupant at each breath, also commensurate with the measured state of vehicle cabin pressure. The deployment and subsequent operation of these systems will be based on a level of vehicle cabin pressure being monitored either by the vehicle or by the oxygen system itself. Any suitable deployment or regulation scheme is contemplated herein. The configuration and architecture of the supplemental oxygen system can be of a type, capacity and independence as to ensure that the level of safety of the passenger is adequate relative to the likelihood of there being a loss of cabin pressure, or there being a loss of safety margin with regards to oxygen system operation at any point during the operation of the vehicle.

The realization of the Hyperloop is a relatively recent occurrence that is considered to be without precedence. Based on the above, the implementation of supplemental oxygen to account for a loss of cabin pressure and that of the level of cabin pressure be controlled to consider the performance of the oxygen system and physiological limitations of the travelling public will enhance the viability of transportation systems such as Hyperloop.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A low pressure enclosure (LPE) vehicle, comprising:
   a hull defining a cabin therein, the hull configured to travel within an LPE configured to operate in a near vacuum, wherein the cabin is configured to be pressurized; and
   a supplemental oxygen system configured to be activated and/or made accessible to one or more occupants within the cabin in a depressurized state such that a cabin pressure is less than a threshold cabin pressure,
   wherein the LPE is configured to be at least partially repressurized in response to a depressurization event of the LPE vehicle.

2. The LPE vehicle of claim 1, wherein the supplemental oxygen system includes one or more containers having one or more oxygen dispensing masks and/or an oxygen supply.

3. The LPE vehicle of claim 2, wherein the one or more containers are integrated into a cabin structure.

4. The LPE vehicle of claim 3, wherein the cabin structure is a cabin ceiling or passenger service unit.

5. The LPE vehicle of claim 4, wherein the vehicle further comprises one or more occupant seats.

6. The LPE vehicle of claim 5, wherein each of one or more containers are disposed over a respective passenger seat of the one or more occupant seats.

7. The LPE vehicle of claim 6, wherein the threshold cabin pressure is 8.29 psia.

8. The LPE vehicle of claim 6, wherein each container is configured to allow deployment of the one or more oxygen dispensing masks when cabin pressure sensed by a cabin pressure sensor and/or controller decreases below the threshold.

9. The LPE vehicle of claim 8, wherein each container includes a controllable container door to allow the one or more oxygen dispensing masks to drop out of the container when the cabin pressure decreases below the threshold for the set amount of time.

10. The LPE vehicle of claim 1, wherein the near vacuum is an evacuated continuous length tube pressurized at a pressure on the order of 100 Pa.

11. A low pressure enclosure transportation system, comprising:
    a low pressure enclosure (LPE) configured to allow a passenger carrying vehicle to be contained therein and move therein; and
    a low pressure enclosure (LPE) vehicle, comprising:
      a hull defining a cabin therein, the hull configured to travel within a LPE, wherein the cabin is configured to be pressurized; and
      a supplemental oxygen system configured to be activated and/or made accessible to one or more occupants within the cabin in a depressurized state such that a cabin pressure is less than a threshold cabin pressure;
    wherein the LPE is configured to be at least partially repressurized in response to a depressurization event of the LPE vehicle.

12. The LPE vehicle of claim 11, wherein the supplemental oxygen system includes one or more containers having one or more oxygen dispensing masks and/or an oxygen supply.

13. The LPE vehicle of claim 12, wherein the one or more containers are integrated into a cabin structure.

14. The LPE vehicle of claim 13, wherein the cabin structure is a cabin ceiling or passenger service unit.

15. The LPE vehicle of claim 14, wherein the vehicle further comprises one or more occupant seats.

16. The LPE vehicle of claim 15, wherein each of one or more containers are disposed over a respective passenger seat of the one or more occupant seats.

17. The LPE vehicle of claim 16, wherein the threshold cabin pressure is 8.29 psia.

18. The LPE vehicle of claim 16, wherein each container is configured to allow deployment of the one or more oxygen dispensing masks when cabin pressure sensed by a cabin pressure sensor and/or controller decreases below the threshold.

19. The LPE vehicle of claim 18, wherein each container includes a controllable container door to allow the one or more oxygen dispensing masks to drop out of the container when the cabin pressure decreases below the threshold for the set amount of time.

20. A method, comprising:
    placing an emergency supplemental oxygen system in a low pressure enclosure vehicle configured to travel within a low pressure enclosure (LPE) having an LPE cavity;
    detecting cabin depressurization;
    deploying one or masks to provide a suitable amount of oxygen to occupants within the cabin; and
    partially repressurizing the LPE to reduce a pressure differential between the LPE cavity and the cabin to maintain a suitable emergency cabin pressure for use of the supplemental oxygen system.

* * * * *